(12) United States Patent
Dang et al.

(10) Patent No.: US 8,250,464 B2
(45) Date of Patent: Aug. 21, 2012

(54) PARSING A MARKUP LANGUAGE DOCUMENT

(75) Inventors: Ya Bin Dang, Beijing (CN); Yi Ge, Haidian (CN); Ling Shao, Beijing (CN); Zhiyong Liang, Beijing (CN); Yang Xu, Lanzhou Gansu Province (CN)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 12/141,541

(22) Filed: Jun. 18, 2008
(Under 37 CFR 1.47)

(65) Prior Publication Data
US 2009/0006944 A1  Jan. 1, 2009

(30) Foreign Application Priority Data

Jun. 18, 2007  (CN) .................. 2007 1 01110184

(51) Int. Cl.
*G06F 17/00* (2006.01)
(52) U.S. Cl. ...................................... 715/234
(58) Field of Classification Search .................. 715/234, 715/236, 237
See application file for complete search history.

(56) References Cited

U.S. PATENT DOCUMENTS

| | | | | |
|---|---|---|---|---|
| 4,547,882 | A * | 10/1985 | Tanner | 714/755 |
| 2002/0122060 | A1* | 9/2002 | Markel | 345/760 |
| 2003/0069881 | A1* | 4/2003 | Huttunen | 707/5 |
| 2004/0044987 | A1* | 3/2004 | Kompalli et al. | 717/100 |
| 2005/0049996 | A1* | 3/2005 | Srinivasan et al. | 707/1 |
| 2005/0097455 | A1 | 5/2005 | Zhou et al. | |
| 2005/0188364 | A1 | 8/2005 | Cockx et al. | |
| 2007/0061345 | A1* | 3/2007 | Thompson et al. | 707/100 |
| 2007/0150808 | A1* | 6/2007 | Harrington | 715/523 |
| 2008/0288575 | A1* | 11/2008 | Larson | 709/201 |
| 2009/0030921 | A1* | 1/2009 | Kadiyska et al. | 707/101 |
| 2009/0089658 | A1* | 4/2009 | Chiu et al. | 715/234 |
| 2011/0119315 | A1* | 5/2011 | Shetty et al. | 707/804 |

OTHER PUBLICATIONS

Wei Lu et al. "A Parallel Approach to XML parsing", 2006, pp. 223-230, URL<http://delivery.acm.org/10.1145/1520000/1513966/04100476.pdf?ip=151.207.246.4&acc=ACTIVE%20SERVICE&CFID=72383747&CFTOKEN=65323010&_acm_=1323378199469a1597399b9780e013e998a1e93499>.*
Lu et al., "ParaXML: A parallel XML processing Model on the Multicore CPUs", Date: Apr. 2008 URL<http://citeseerx.ist.psu.edu/viewdoc/summary?doi=10.1.1.142.4655>.*

(Continued)

*Primary Examiner* — Laurie Ries
*Assistant Examiner* — Mustafa Amin
(74) *Attorney, Agent, or Firm* — Jon A. Gibbons; Fleit Gibbons Gutman Bongini & Bianco PL

(57) ABSTRACT

A method and system for parsing a markup language document are disclosed in the invention. The method comprises: pre-splitting a body of the markup language document into plurality parts; scanning each of the plurality parts, wherein while each of the parts is scanned, the scanning of the part is stopped only when a specific mark is found, and then a stop point at which the scanning is stopped is recorded; splitting the body of the markup language document into a plurality of fragments using the respective stop points; parsing the plurality of fragments in parallel and producing parsing results for the respective fragments; and combining the parsing results for the respective fragments to form a parsing result for the markup language document. A parsing method that supports namespace is also provided.

17 Claims, 14 Drawing Sheets

OTHER PUBLICATIONS

Benedikt et al., "Capturing both Types and Constraints in Data intergration", 2003, 12 pages, URL:<http://delivery.acm.org/10.1145/880000/872792/p277-benedikt.pdf?ip=151.207.244.4&acc=ACTIVE%20SERVICE&CFID=95936739&CFTOKEN=57062124&_acm_=1333730207_3270164f004332C8fb377ab42000fe8b>.*

Pan, Y., et al., A Static Load-Balancing Scheme for Parallel XL Parsing on Multicore CPUs, in CCGRID '07: Proceedings of the Seventh IEEE International Symposium on Cluster Computing and the Grid, pp. 351-362, Washington, DC, USA 2007, IEEE Computer Society.

Lü et al., Parallel Processing XML Documents, Proceedings of the International Database Engineering and Applications Symposium (IDEAS'02) 1098-8068/02 ©2002 IEEE, 10 pages.

Letz et al., XML Offload and Acceleration with Cell Broadband Engine TM, XTech 2006: "Building Web 2.0"-May 16-19, 2006, 10 pages, Amsterdam, The Netherlands. http://xtech06.usefulinc.com/schedule/paper/27.

Gygi Francois, Data Management Issues in Large-Scale First-Principles Molecular Dynamics, SDM Workshop, Dec. 11, 2006, 34 pages, Berkeley, CA., http://www.eslab.ucdavis.edu.

* cited by examiner (a) FLP  (b) IFLP

PARSING A MARKUP LANGUAGE DOCUMENT

CROSS-REFERENCE TO RELATED APPLICATIONS

This application is based upon and claims priority from a prior Chinese Patent Application No. 200710110184.7, filed on Jun. 18, 2007, the entire disclosure of which is herein incorporated by reference in its entirety.

FIELD OF THE INVENTION

The present invention relates to a method and parser for parsing a markup language document, and in particular, to a method and parser for parsing an eXtensible Markup Language (XML) document.

DESCRIPTION OF RELATED ART

Nowadays, as a World Wide Web Consortium (W3C)—recommended general-purpose markup language, eXtensible Markup Language (XML) has been widely used in various applications, such as WebService, Database, etc. XML defines a common grammar to represent data with simple and human-readable markups, and, for example, can appear as a configuration file, a database file, etc. For many XML-based applications, especially database and WebService, response time is one critical performance criterion. Different applications have different requirements for the response time. For example, in an Online Transaction Processing (OLTP) system of a large bank, the response time is usually required to be 100 ms or less, and larger response time will cause the discomfort of users.

The response time of XML-based applications consists of many parts, where the time for XML parsing is inescapable. Since XML parsing involves many time-consuming operations, such as coding conversion, tokenization, well-formed checking, and Document Type Definition (DTD)/XML schema validation, it becomes a performance bottleneck in many XML-based applications, and occupies a main part of the response time. More seriously, some applications use large XML documents. For example, in life science and content management, XML documents of Megabytes (MBs) are very popular, and even in some case, XML documents of Gigabytes (GBs) are needed. Such large XML documents further exacerbate parsing performance. Generally, time spent on parsing a GB-level XML document would be dozens of seconds, which is usually unacceptable.

Therefore, accelerating XML parsing and decreasing the latency can greatly promote the response speed of XML applications. Many techniques have been proposed to achieve this object, which can be classified into two main categories. One category is software-based solutions which can obtain a one to two times (1×~2×) performance promotion, and the other class is hardware-based solutions which usually use offload engines and can achieve much more performance promotion. For example, in non-patent literature by B. Nag, "Acceleration Techniques for XML Processors", In *Proc. XML Conference* 2004, Nag designed an XML Offload Engine (XOE). By offloading tokenization operations to the XOE, XML parsing is accelerated, and computing resources on CPU are released. In non-patent literature by J. van Lunteren, J. Bostian, B. Carey, et al, "XML accelerator engine", In *Proc. the First International Workshop on High Performance XML Processing, in conjunction with the* 13*th International World Wide Web Conference* (*WWW*2004), New York, N.Y., USA, May 2004, an XML acceleration engine named ZUXA was proposed based on a programmable state machine technology, which overcomes performance bottlenecks of software-based XML processing by providing a processing model optimized for conditional execution and dedicated instructions for character and string processing. Additionally, after observing a fact that most XML messages are generated by machines in WebService applications and thus the XML messages in a same service may have similar byte sequences, Takase et al. implemented an XML parser named Deltarser in non-patent literature by T. Takase, H. Miyashita, T. Suzumura, and M. Tatsubori, "An Adaptive, Fast and Safe XML Parser Based on Byte Sequence Memorization", In *Proc. the* 14*th International World Wide Web Conference* (*WWW*2005), May 2005, wherein, given a new XML document in a byte sequence, Deltarser usually does not analyze most of XML syntax in the document, but just compares the byte sequence with those that have already been processed, and reuses previous parsing results, thereby accelerating XML parsing. However, the above parsing accelerating methods have their limitations. The first two solutions XOE and ZUXA need additional hardware support, which seems to be unavailable in the foreseeable future. The third solution, Deltarser, is only optimized for a special case of WebService applications. For general applications that XML document structures may vary greatly, Deltarser may not achieve better performance than traditional parsers.

In recent years, multi-core processors have become a growing industry trend as single-core processors rapidly reach physical limits of possible complexity and speed. Currently, many companies have offered multi-core chips in markets of different fields, e.g. IBM Cell, IBM Power6, Sun Niagara, Intel Quad-core processor, AMD Dual-core processor, etc. The appearance of multi-core processors brings new opportunities to XML processing.

A multi-core processor comprises a plurality of processing elements (PEs), and the time for XML processing can be reduced by using the plurality of PEs to parse an XML document in parallel, thereby improving the performance of XML applications. According to the granularity of parallel parsing, parallel parsing methods for an XML document can be classified into two classes which are respectively shown in FIG. 1(*a*) and FIG. 1(*b*):

1. File-Level Parallel Parsing (FLP)

As shown in FIG. 1(*a*) (taking an example of two PEs), in the FLP mode, two XML documents are dispatched to two different PEs, respectively. Each of the PEs parses one complete XML document. For example, non-patent literature by Stefan Letz, Michel Zedler, Tobias Thierer et al, "XML Offload and Acceleration with Cell Broadband Engine™", XTech 2006: Building Web 2.0, Amsterdam, the Netherlands, May 16-19, 2006 proposed an FLP method which parses 8 XML documents in parallel using 8 parsing threads running on a single Cell, so that the total time needed for parsing these XML documents is reduced. However, this method can not be used to parse a single XML document in parallel.

2. Intra-File-Level Parallel Parsing (IFLP)

As shown in FIG. 1(*b*) (taking an example of two PEs), in the IFLP mode, a complete XML document is split into two fragments which are simultaneously parsed by the two PEs. Compared to the FLP mode, the IFLP mode can utilize processing resources better and decrease the time needed for parsing a single document.

For the IFLP, several problems need to be solved:

(1) How to decompose a parsing task

In order to balance workloads among respective PEs and make each fragment parsable, the XML document should be split reasonably and evenly.

(2) How to parse XML fragments

XML fragments obtained by splitting often do not match XML grammar, so the XML document fragments must be able to be parsed correctly.

(3) How to combine parsing results correctly

After the parsing results for the respective fragments are obtained, these parsing results must be combined correctly, and the obtained final result should be the same as that obtained by using traditional XML parsers to parse the document.

(4) How to support XML namespace

XML namespace is an important feature of an XML document. An element in the XML document inherits the namespace from its ancestor elements. However, splitting the XML document often renders that one element and its ancestor elements are respectively in different fragments, and at this time, the element cannot obtain its namespace by inheritance. In this case, an IFLP parser must be able to handle the namespace correctly.

In non-patent literature by Wei Lu, Kenneth Chiu and Yufei Pan, "A parallel XML parser", <http://www.cs.indiana.edu/~welu/pxp_grid06.pdf>, an IFLP method was proposed, which pre-parses an entire XML document first to determine a skeleton of the XML document, splits the XML document according to the obtained skeleton to get a plurality of document fragments, and then parses the plurality of documents fragments in parallel by multiple PEs. However, in the IFLP method, because the pre-parsing step needs a large overhead and complex communication is needed among respective parsing threads during the parallel parsing, this method has a limited effect of accelerating the parsing speed, and when the number of the parallel parsing threads increases, the performance of the method decreases sharply. Furthermore, this method can not support the XML namespace.

SUMMARY OF THE INVENTION

The present invention is made to overcome the above problems in the related art. In one embodiment the present invention provides a method and parser for parsing an XML document, which can utilize a plurality of processing elements (PEs) to parse a single XML document in parallel, so as to accelerate the XML document parsing and reduce the parsing time. In another embodiment the present invention provides an XML document parallel parsing method supporting the namespace.

According to an aspect of the invention, there is provided a method of parsing a markup language document, comprising: a pre-splitting step for pre-splitting a body of the markup language document into multiple parts; a scanning step for scanning each of the multiple parts, wherein while each of the parts is scanned, the scanning of the part is stopped only when a specific mark is found, and then a stop point at which the scanning is stopped is recorded; a splitting step for splitting the body of the markup language document into a plurality of fragments using the respective stop points; a parsing step for parsing the plurality of fragments in parallel and producing parsing results for the respective fragments; and a combining step for combining the parsing results for the respective fragments to form a parsing result for the markup language document.

According to another aspect of the invention, there is provided a parser for parsing a markup language document, comprising: a pre-splitting means for pre-splitting a body of the markup language document into multiple parts; a scanning means for scanning each of the multiple parts, wherein when scanning each of the parts, the scanning means stops the scanning of the part only when a specific mark is found and records a stop point at which the scanning is stopped; a splitting means for splitting the body of the markup language document into a plurality of fragments using the respective stop points; multiple processing elements each of which is assigned one of the plurality of fragments, the multiple processing elements parsing the plurality of fragments in parallel and producing respective parsing results; and a combining means for combining the parsing results produced by the multiple processing elements to form a parsing result for the markup language document.

According to yet another aspect of the invention, there is provided a method of parsing a markup language document which is split into a plurality of fragments, the method comprising steps of: parsing the plurality of fragments in parallel and producing parsing results for the respective fragments represented by double-edge (DE) trees, wherein when a first fragment is parsed, an ancestor node variable of a node of a double-edge tree corresponding to the fragment is set to NULL, and a local namespace variable thereof is set to a namespace aggregation obtained by a parsing from a root node of the double-edge tree to the node, and when other fragment is parsed, the ancestor node variable of a node on a leftmost path of a double-edge tree corresponding to the fragment is set to NULL and a local namespace variable thereof is set to be empty, and the ancestor node variable of each of remaining nodes is set to a node nearest thereto on the leftmost path and the local namespace variable thereof is set to a namespace aggregation obtained by a parsing from the nearest node to the each of remaining nodes; and sequentially combining the double-edges tree corresponding to the respective fragments from left to right to thereby form a parsing result for the markup language document, wherein when two double-edge trees corresponding to two adjacent fragments are combined, the ancestor node variable of a combined node is set to NULL, and the local namespace variable thereof is set to a value of the local namespace variable of a corresponding node on the double-edge tree corresponding to a left fragment.

The XML document parsing method and parser according to the present invention accelerate the parsing of a single XML document and reduce the time required for the parsing by parsing the XML document using a plurality of PEs of a multi-core processor. The XML document parsing method and parser according to the present invention have a better effect in the case of big XML documents. Further, the XML document parsing method and parser according to the present invention can also provide a good support to XML documents having different namespaces defined.

BRIEF DESCRIPTION OF THE DRAWINGS

The above and other objects, features, and advantages of the present invention will become more apparent from the detailed description of embodiments of the present invention in conjunction with the figures in which.

DETAILED DESCRIPTION OF THE INVENTION

Hereinafter, an XML document parsing method and a parser according to the present invention will be described in detail with reference to the figures.

An XML document comprises a prolog part and a body part. The prolog part indicates a version number of a standard used by the XML document, encoding type, document type definition, and so on, and the body part is a part from a first element start-tag to the end of the document and includes detailed contents of the XML document. In the present invention, only the body part of the XML document is parsed in parallel.

First Embodiment

Firstly, an XML document parallel parsing method according to a first embodiment of the present invention is described with reference to the figures. It is assumed that a multi-core processor has N PEs. The method uses a parser named PParser to perform parsing.

Figure 1:
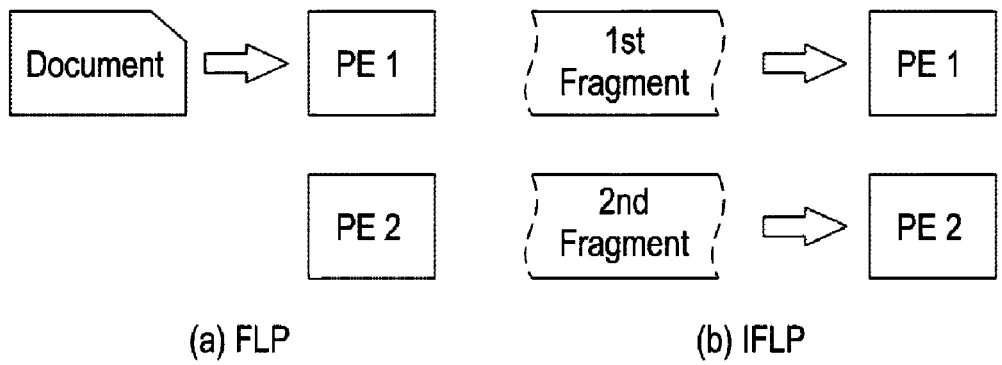
FIG. 1(a) and FIG. 1(b) show two granularities of parsing an XML document in parallel, respectively.
Figure 2:
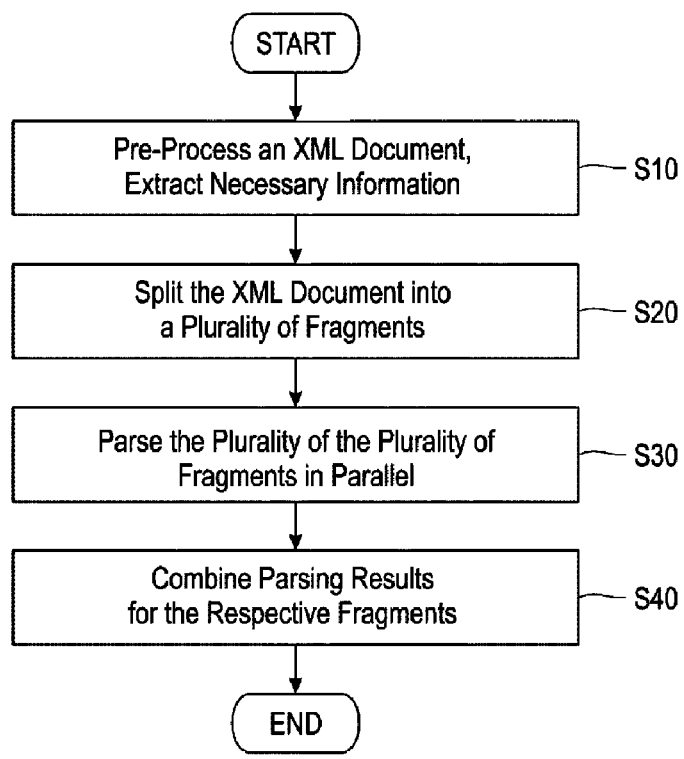
FIG. 2 is a flow chart showing an XML document parsing method according to a first embodiment of the present invention.

FIG. 2 shows a flow chart of the XML document parallel parsing method according to the first embodiment of the present invention.

As shown in FIG. 2, in step S10, PParser pre-processes the XML document before parsing the document, and extracts information necessary for following processing, such as the version of the XML document, encoding information, document type definition (DTD), and so on, from a prolog part. Since the prolog part of the XML document is much shorter than its body part, the time overhead for the pre-processing step is low as compared to the whole parsing procedure.

Next, in step S20, PParser utilizes a Random Cutting-in Then Scanning (RCTS) method according to the present invention to split the XML document into a plurality of fragments so as to perform the parallel parsing. The RCTS method will be described later.

Then, in step S30, PParser utilizes multiple PEs to parse the plurality of fragments in parallel, and generates parsing results for the respective fragments with a document object model (DOM)-like tree being used to represent the parsing result for each of the fragments.

Finally, in step S40, PParser combines the parsing results for the respective fragments so as to form a final parsing result for the XML document.

Hereinafter, respective steps of the XML document parsing method according to the present invention will be described in more detail with reference to the figures.

Figure 3:
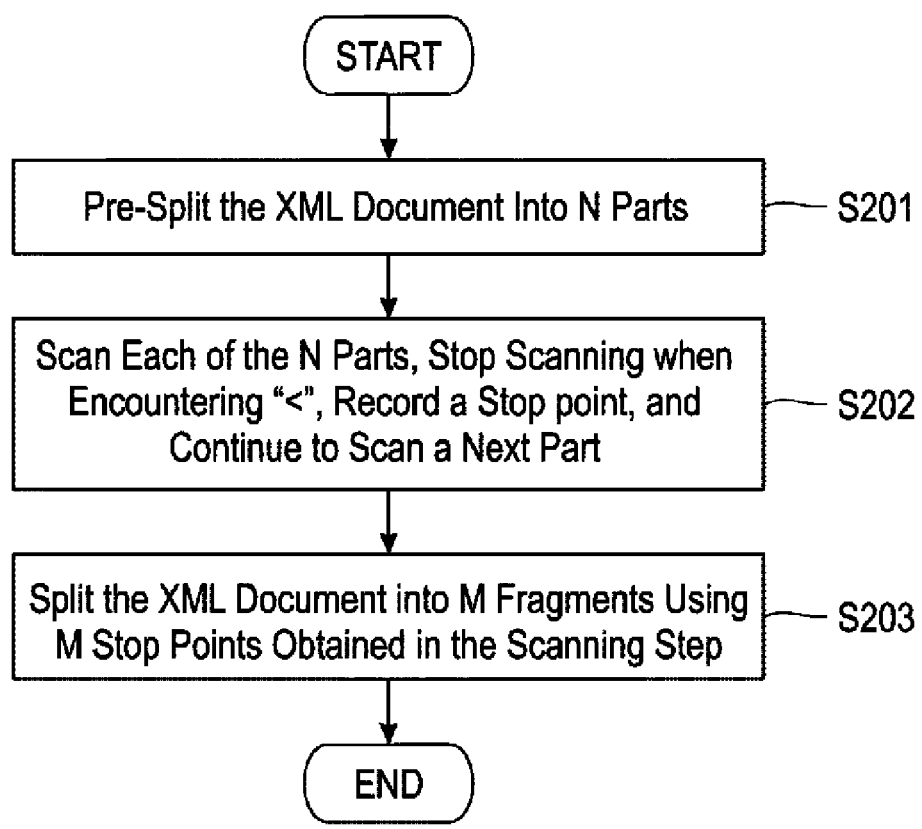
FIG. 3 is a flow chart showing operations in step S20 illustrated in FIG. 2 according to the first embodiment of the present invention.

Firstly, the step S20 of the XML document parsing method according to the first embodiment of the present invention will be described in detail with reference to FIG. 3. FIG. 3 shows a flow chart of operations in step S20 in FIG. 2, i.e. using the RCTS method to split the XML document.

In an XML document, as XML specification, a left angle bracket ("<") is a reserved character. Although there are many left angle brackets in the XML body part, generally speaking, there are only two possibilities for them to appear in the XML document:

(1) they are used as markup delimiters, that is, at the beginning of logical structures starting from "<", and the logical structures includes all independent structures in the XML document, such as start-tag and end-tag of elements, comment, processing instruction, CDATA, etc.

(2) they are at the interior of three special structures including comment, processing instruction (PI), and CDATA whose grammars are as follows:

---
Comment: <!-- ... -->
Processing Instruction: <? Target...?>
CDATA: <![CDATA[ ... ]]>
---

Noting the above fact, in the RCTS method according to the present invention, the left angle bracket "<" can be used as a division point to split the body part of the XML document, so that the initial parsing state of each fragment can be constrained to the above two possible cases.

Referring to FIG. 3, in step S201, PParser pre-splits the body part of the XML document into N parts, since the multi-core processor has N PEs. Preferably, PParser equally pre-splits the body part of the XML document as a successive character sequence into the N parts. However, it is to be appreciated that equally splitting the body part of the XML document is to balance the workloads of PEs for parsing the respective fragments; and in fact, the body part can also be unequally split. Furthermore, although the body part of the XML document is pre-split according to the number of available PEs as described above, this is only for the purpose of making a full use of all available PEs to perform the parallel parsing so as to accelerate the parsing speed as much as possible; actually, the body part can also be pre-split into less than N parts.

Next, in step S202, PParser scans the N parts, wherein PParser forms a virtual scanner for each of the N parts and each virtual scanner is responsible for scanning one part, and PParser sequentially performs scanning tasks of the N virtual scanners in a serial way. Specifically, a scanning start position of each virtual scanner is set to the beginning of corresponding part to be scanned; during scanning this part, the virtual scanner scans the character string of this part from left to right from the scanning start position; and once encountering a left angle bracket "<", the virtual scanner stops scanning this part and record a current stop point. Then, PParser starts a next virtual scanner to continue to scan a next part. After the N parts are scanned, M stop points are obtained. Since the virtual scanners may not encounter the left angle bracket "<" during scanning, the number "M" of the stop points may be equal to or less than N.

Then, in step S203, PParser uses the M stop points as splitting points (there is one stop point located at the beginning of the body part of the document) to split the body part of the XML document into M fragments.

It is to be noted that in the above scanning step S202, the scanning direction of the virtual scanner for each part is not limited to from left to right, but can also be from right to left, and in this case, the scanning start position of the virtual scanner should be correspondingly set to the end of each of the parts. In addition, as a flag of stopping scanning, not only the left angle bracket "<", but also a right angle bracket ">" can be used; and, when encountering said flag, the virtual scanners may stop scanning this part immediately, or continue to scan several characters and then stop scanning this part.

It is also to be appreciated that the above RCTS method may be performed by only one PE. That is, the one PE pre-splits the XML document into N parts, sequentially performs scanning tasks of N virtual scanners in a serial way, and uses the obtained stop points to split the XML document.

The RCTS method according to the present invention is described below in conjunction with a particular example. Assume that the multi-core processor has three PEs. An exemplary XML document 1 is as follows:

| [Exemplary XML Document 1] |
| --- |
| 1 <?xml version="1.0"?> |
| 2     @ § <INVENTORY> |
| 3         <BOOK> |
| 4             <TITLE>book1</TITLE> |
| 5             <AUTHOR> |
| 6                 <NAME>author1</NAME> |
| 7                 <NAM@E>author2 § </NAME> |
| 8             </AUTHOR> |
| 9             <PRICE>$21.95</PRICE> |
| 10        </BOOK> |
| 11        <BOOK> |
| 12            <TITLE>book2</TITLE> |
| 13            <AUT@HOR> |
| 14                § <NAME>author3</NAME> |
| 15                <NAME>author4</NAME> |
| 16            </AUTHOR> |
| 17            <PRICE>$4.25</PRICE> |
| 18        </BOOK> |
| 19    </INVENTORY> |

In this exemplary XML document 1, line 1 is the prolog part, and lines 2-19 are the body part. Since the multi-core processor has three PEs, in step S201, the body part of the XML document as a character string sequence is equally pre-split into three parts. As is shown above, a symbol "@" is used to represent the beginning of each of the parts. It can be seen that the symbol "@" is in lines 2, 7 and 13 respectively. It should be noted that the symbol "@" in the above document is only for the purpose of illustrating the positions of pre-splitting points and actually does not exist in the document. Next, in step S202, PParser forms a virtual scanner for each of the three parts, sets scanning start positions of the virtual scanners to the beginnings of corresponding parts (that is, the positions of symbol "@"), and then sequentially performs the scanning task of each virtual scanner in a serial way, wherein each virtual scanner scans the character string of each corresponding part from the left to right, and once encountering a left angle bracket "<", the virtual scanner stops scanning this part and records the corresponding stop point. Subsequently, a next virtual scanner is started to continue to scan a next part. In the above document, a symbol "§" is used to represent the rstop points. It can be seen that the obtained three stop points are in lines 2, 7 and 14, respectively. The scanning distances of the three virtual scanner are 1, 10 and 7 bytes respectively (assuming that line break also occupies one byte). Likewise, the symbol "§" in above document is only for the purpose of illustrating the positions of the stop points and actually does not exist in the document. Finally, in step 203, PParser splits the exemplary XML document 1 into three fragments by using the obtained three stop points as the splitting points.

As compared with other splitting methods of the related art, the RCTS method according to the present invention has at least the following advantages.

(1) Using the left angle bracket "<" to split an XML document enables the initial parsing state of each fragment to be limited to only two possible states, thereby facilitating the subsequent parsing.

(2) Pre-scanning is almost avoided. Since the appearing frequency of the left angle bracket "<" in an XML file is very high, the scanning distance of each virtual scanner is very short and thus the caused time overhead and processing resource overhead are very low.

(3) Fragments have similar lengths. Therefore, processing resources could be used more balancedly when these fragments are parsed in parallel.

As described above, after step S20 is finished, step S30 is performed, in which PParser assigns the M XML document fragments obtained in step S20 respectively to M PEs which parse these fragments in parallel and produce respective parsing results. The method of parsing each fragment in step S30 is described below in detail with reference to FIG. 4-6.

First, an initial parsing state of each fragment needs to be determined.

Figure 4:
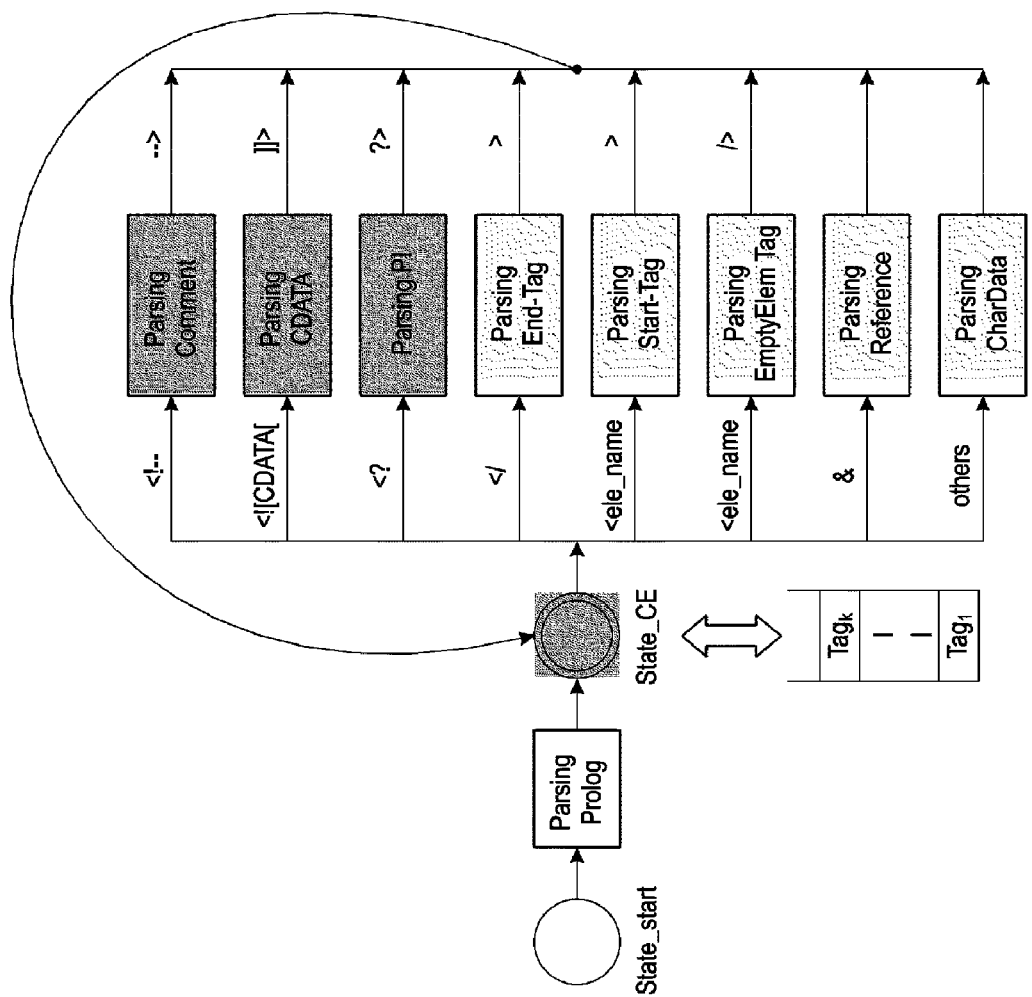
FIG. 4 is a state transition graph in a Push Down Automaton (PDA) when an entire XML document is parsed using a conventional XML parser.

FIG. 4 shows state transitions in a Push Down Automaton (PDA) for parsing an entire XML document, where circles and directed arcs represent parsing states and state transitions respectively, and rectangles represent the parsing procedure which is a cluster of states and state transitions.

When the entire XML document is parsed using a conventional XML document parser, the parsing starts at State_Start state. After the prolog part is parsed, the parsing enters State_CE (content of elements) state, which means that the parsing is at the interior of elements. At the State_CE state, based on different read-in character sequences, the PE invokes different parsing procedures to parse different XML structures, such as Start-tag of element, End-tag of element, Comment, CDATA, PI, Reference, and CharData. After the entire structure is parsed, the parsing state returns to the State_CE state again.

Figure 5:
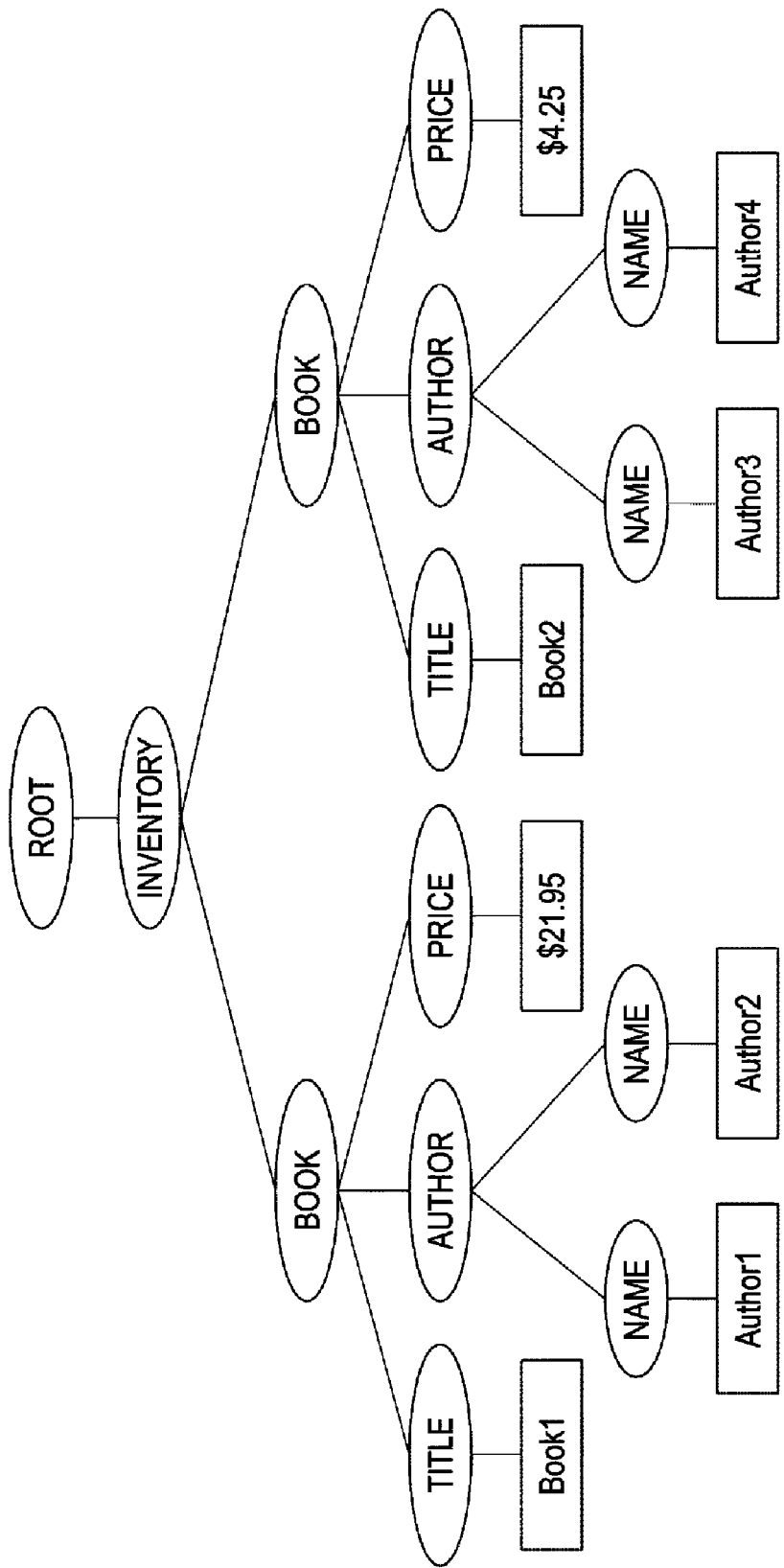
FIG. 5 shows a parsing result obtained by using a conventional XML parser to parse an exemplary XML document 1.

Furthermore, a stack associated with the State_CE state is used to store element start-tags on the path from a root node to a current node. When an element start-tag is identified, it will be pushed into the stack. When an element end-tag is identified, the start-tag on the top of the stack will be popped up and compared with this end-tag; and if at this time the stack is empty or the start-tag doesn't match the end-tag, an error will be reported. FIG. 5 shows a parsing result obtained by using a conventional XML parser to parse the exemplary XML document 1, and the parsing result is represented by a DOM tree. When the XML document parallel parsing method according to the present invention is used to parse the XML document, a same parsing result as that in FIG. 5 should be obtained.

As described above, all of the fragments obtained by the RCTS method start with the left angle bracket "<", and their initial parsing states are either at State_CE (as shown by the gray circle in FIG. 4) or at the interior of parsing the three special structures (as shown by the gray rectangles in FIG. 4). Since the context is unknown, the initial parsing state of each of the fragments can not be determined. To this end, considering a fact that the left angle bracket "<" has a quite low probability to appear in three special structures, the initial parsing state of each of the fragments is assumed to be at State_CE state, and then each of the fragments is parsed only once. In a subsequent combining phase, if the assumption for a certain fragment is found to be wrong, the fragment will be re-parsed. Likewise, the probability of reparsing is quite low.

After determining the initial parsing states of the fragments, PEs begin to parse the respective fragments.

Every logical structure in an XML document can be regarded as an inclusion between a start-tag and an end-tag. For example, in a Comment structure, its start-tag and end_tag are "<!--" and "-->" respectively. For a structure without the start-tag and the end-tag, e.g. CharData, it is assumed that its start-tag and end-tag are existent. Thus, when an XML document fragment is parsed, a serial of start-tags and end-tags will be identified. The start tag or the end tag is denoted by a 2-tuple, Tag={type, name}, in which the type field denotes the type of the tag and has the following possible values according to different logic structures:
SE, EE: start-tag and end-tag of an element structure;
SCO, ECO: start-tag and end-tag of Comment;
SCD, ECD: start-tag and end-tag of CDATA;
SPI, EPI: start-tag and end-tag of PI;
SRE, ERE: start-tag and end-tag of Reference; and
SCH, ECH: virtual start-tag and end-tag of CharData.
And, if the value of the type field is SE or EE, the name field is used to store element names; otherwise, the name field is set to NULL.

In the present invention, a new data structure, i.e. a Double-edge (DE) tree, is proposed. The DE tree has a tree structure similar to that of a DOM tree, and data structures of its nodes are the same as those of the DOM tree. The DE tree is different from the DOM tree in that: in the DOM tree, all parsing information is stored in nodes of the tree, and branches of the tree only represent the relationship between the respective nodes; while in the DE tree, some parsing information is also stored in branches of the tree, including tag type, element name, etc. Thus, the data structures of branches of the DE tree is also denoted with a 2-tuple, i.e. Branch={type, name}.

The parsing result for a fragment is represented using a 5-tuple, $R_i=\{F, T, S, E, C\}$, where F represents the fragment itself and is reserved for the reparsing when the assumed initial parsing state is wrong; T is the DE tree obtained by parsing the fragment; S is a pointer to a start-parsing node in T; E is a pointer to an end-parsing node in T; and C is a flag indicating whether the parsing result has an error, and has the following three possible values: ERROR (indicating that there is at least one error in parsing), CORRECTNESS_CE (indicating that the parsing is ended at state State_CE), and CORRECTNESS_SS (indicating that the parsing is ended at an interior parsing state of special structures).

In step S30, each PE parses a corresponding fragment according to the following principles:
1. when a start-tag is recognized, the DE tree grows downwards; and
2. when an end-tag is recognized, the DE tree grows upwards.

In particular, each PE parses the corresponding fragment according to the following steps:
1) at the start, the PE generates a DE tree with only one node, sets the initial parsing state to State_CE state, and reads in a next character; and
2) at the State_CE state, the PE performs different operations according to different read-in character sequences:
(1) if identifying an element start-tag, the PE generates one downward branch from current node. The type field of the downward branch is set to SE, and the name field of the downward branch is set to the element name in the element start-tag. Then, the parsing state returns to the State_CE state, and the current node is set to the newly generated node.
(2) if identifying an element end-tag, the PE generates one upward branch from current node. The type field of the upward branch is set to EE, and the name field of the upward branch is set to the element name in the element end-tag. If it is found that one parallel downward branch exists in the DE tree at this time, the type fields and name fields of the two branches are respectively compared. If they match each other, the parsing state returns to State_CE, and the current node is set to the node pointed by the upward branch; and if they do not match each other, an error will be reported.
(3) when identifying a start-tag of other logical structures, the PE first generates one downward branch from current node and sets the type field of this branch to the start-tag of the structure which is being parsed, and then performs operations depending on the following two cases:
A. if a corresponding end-tag is not found until the fragment is parsed completely, the parsing state stops at the interior of the parsing of current structure, and the current node is set to the node pointed by the downward branch; and
B. if the corresponding end-tag is found before the fragment is parsed completely, an upward branch is generated from current node, and the type field of this upward branch is set to the end-tag. Then, the parsing state returns to State_CE, and the current node is set to the node pointed by this upward branch.

The PE sequentially reads in the character sequence of the corresponding XML document fragment from left to right, and constructs the DE tree as described above, until the last character is parsed. During this process, The PE updates other parsing parameters including S, E, and C synchronously.

It should be noted that the end-paring state of each fragment only has two possibilities, i.e. State_CE and the interior of parsing the three special structures. If the end-parsing state of a certain fragment is not any one of the two states, an error will be reported.

As described above, the XML document parsing method according to the first embodiment of the present invention uses M PEs to parse M fragments in parallel, and thus obtains M DE trees as the parsing results.

Figure 6:
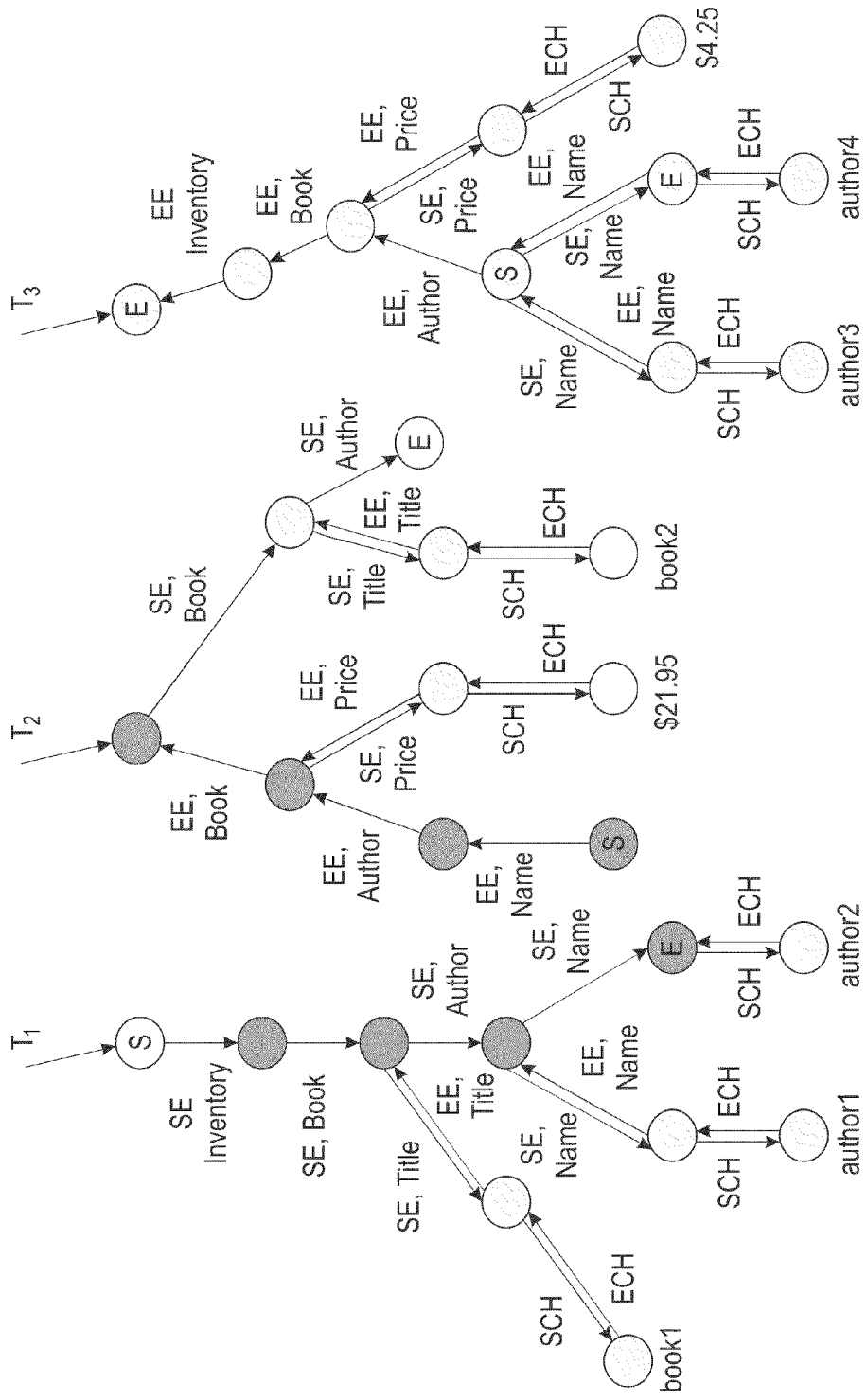
FIG. 6 shows a parsing result obtained by using the parsing method according to the first embodiment of the present invention to parse the exemplary XML document 1.

Still taking the above exemplary XML document 1 as an example, three DE trees $T_1$, $T_2$ and $T_3$ which are shown in FIG. 6 may be obtained by using the parsing method according to the first embodiment of the present invention to parse three fragments of the document, where nodes labeled with "S" are start-parsing nodes, and nodes labeled with "E" are end-parsing nodes.

It is to be understood by those skilled in this art that, although a particular method of parsing XML document fragments is given above, in fact, there are many similar methods in the art that can be used to parse the fragments and obtain parsing results and DE trees similar to those of the present invention (for example, as shown in FIG. 6). Therefore, the method of parsing XML document fragments is not limited to the particular method given above.

As described above, after the parsing of each of the fragments of the XML document is finished, in step S40, PParser combines the M DE trees to obtain the parsing result for the entire XML document. In the combining phase, two issues need to be considered:

(1) as described above, when each of the fragments is being parsed, the initial parsing state of the fragment is set to State_CE. However, this assumption may be wrong for some fragments, in which case these fragments should be re-parsed.

(2) start-tags and end-tags should be checked for correct nesting. The start-tag and end-tag from a same element may be distributed in two different fragments, so their nesting should be checked in the combining phase.

In addition, to avoid errors from occurring in the combination result, the DE trees should be combined in an order of from left to right. Specifically, a first DE tree and a second DE tree are combined at first, then the new DE tree resulted from the combination is combined with a third DE tree; the process is continued until a last DE tree is combined.

Figure 7:
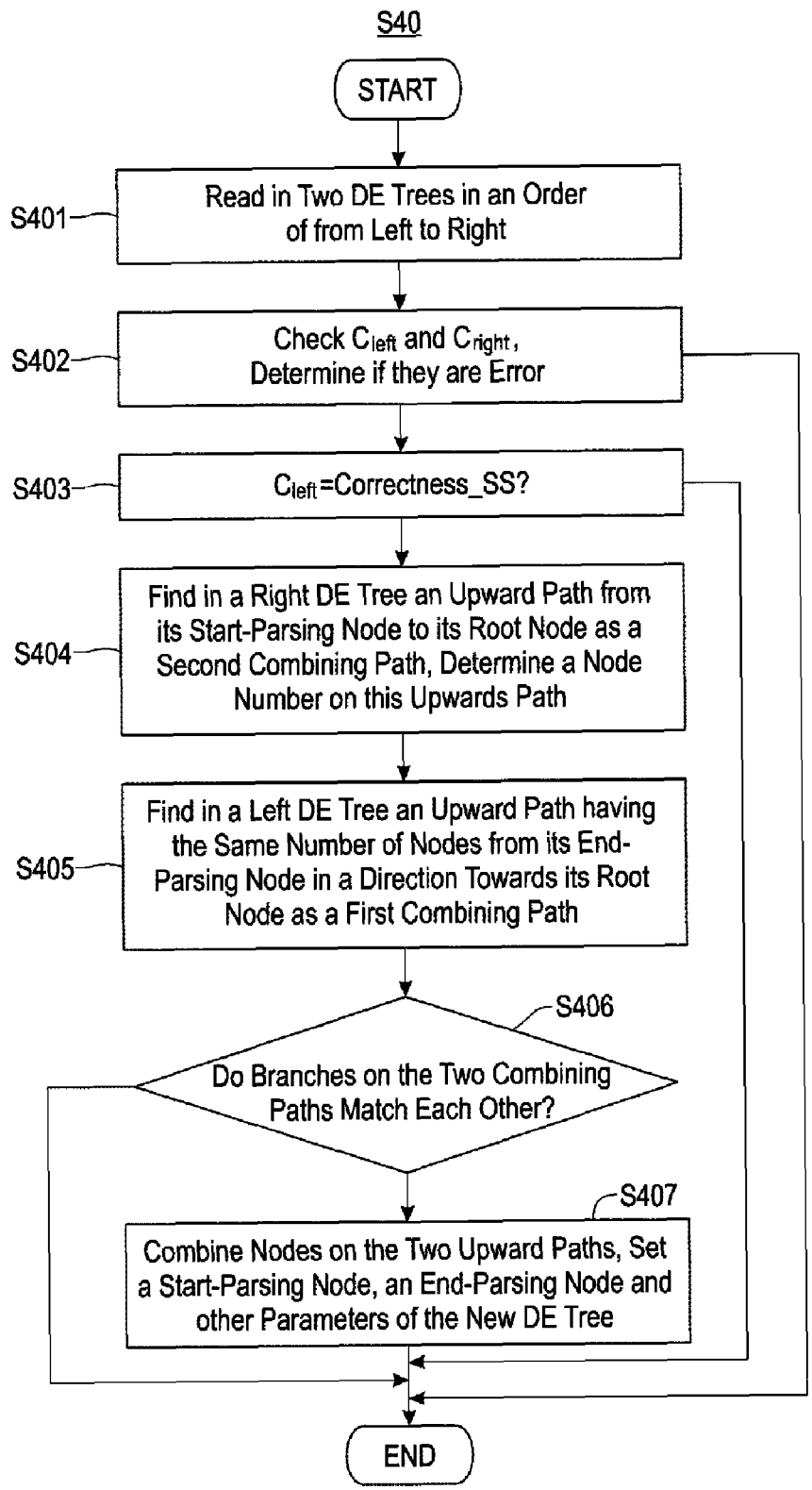
FIG. 7 is a flow chart showing operations in step S40 illustrated in FIG. 2 according to the first embodiment of the present invention.

FIG. 7 shows a flow chart of a method of combining the DE trees in step S40 of FIG. 2.

As shown in FIG. 7, in step S401, a PE reads in two DE trees in an order of from left to right. Assume that $C_{left}$ is a flag corresponding to the left DE tree and indicating whether its parsing result has an error, and $C_{right}$ is a flag corresponding to the right DE tree and indicating whether its parsing result has an error. In step S402, the PE checks $C_{left}$ and $C_{right}$ to determine whether either of them is ERROR. If it is determined in step S402 that either or both of $C_{left}$ and $C_{right}$ are ERROR, which means that the parsing result(s) of the corresponding fragment(s) is wrong, the combining process is terminated. Thereafter, the fragment having an error will be re-parsed by a PE.

On the other hand, if it is determined in step S402 that neither of $C_{left}$ and $C_{right}$ is ERROR, the combining process proceeds to step S403, where the PE determines whether $C_{left}$ is equal to CORRECTNESS_SS. If it is determined in step S403 that $C_{left}$ is equal to CORRECTNESS_SS, this means that the end-parsing state of the left DE tree stops at the interior of parsing the three special structures, thus the assumption for the initial parsing state of the right DE tree is wrong. At this time, the combining process is terminated, and the right fragment will be re-parsed by a PE. On the other hand, if it is determined that $C_{left}$ is not equal to CORRECT-NESS_SS, this means that the end-parsing state of the current DE tree is State_CE, and the assumption for the right DE tree is correct. At this time, the combining process proceeds to step S404.

In step S404, the PE finds, in the right DE tree, an upward path from its start-parsing node S to its root node as a second combining path, and determines the number of nodes, Path-length, on this upward path.

Next, in step S405, the PE finds, in the left DE tree, an upward path having the same number of nodes (i.e. Path-length) from its end-parsing node E in a direction towards its root node as a first combining path.

Then, in step S406, the PE compares type fields and name fields of branches on the first combining path with those on the second combining path respectively to determine whether they match each other. If it is determined in step S406 that they do not match each other, an error is reported and the combining process is terminated. On the other hand, if it is determined in step S406 that they match each other, in step S407, the PE combines nodes on the first combining path with corresponding nodes on the second combining path, sets type fields and name fields of combined branches to those of corresponding branches on the first combining path (or the second combining path), sets the start-parsing node and end-parsing node of the combined new DE tree to the start-parsing node of the left DE tree and the end-parsing node of the right DE tree, respectively, and modifies other internal parsing information correspondingly. Then, the combining process ends.

For the easy understanding of the above combining method, the combining method will be described below using the above exemplary XML document 1. The parsing results for the fragments of the above exemplary XML document 1, i.e. the DE trees $T_1$, $T_2$ and $T_3$ have been shown in FIG. 6.

First, the PE reads in a first DE tree $T_1$ on the left and a second DE tree $T_2$ on the right in an order of from left to right. Then, the PE checks flags C which respectively correspond to the DE trees $T_1$, and $T_2$. In this example, the flags C of the DE trees $T_1$ and $T_2$ are both CORRECTNESS_EC, thus no error occurs in the parsing process, and the combining operation can be continued. Next, the PE finds, in the second DE tree $T_2$, an upward path from its start-parsing node to its root node as a second combining path, and determines the number of nodes on this upward path. As shown in FIG. 6, the second combining path is on the leftmost side of the second DE tree $T_2$, and the number of nodes (gray nodes) thereon, i.e. Path-length, is 4. Subsequently, the PE finds, in the first DE tree $T_1$, an upward path having the same number of nodes (i.e. 4 nodes) from its end-parsing node in a direction towards its root node as a first combining path. As shown in FIG. 6, the first combining path is on the rightmost side of the first DE tree $T_1$, and nodes on the first combining path are represented in gray.

Figure 8:
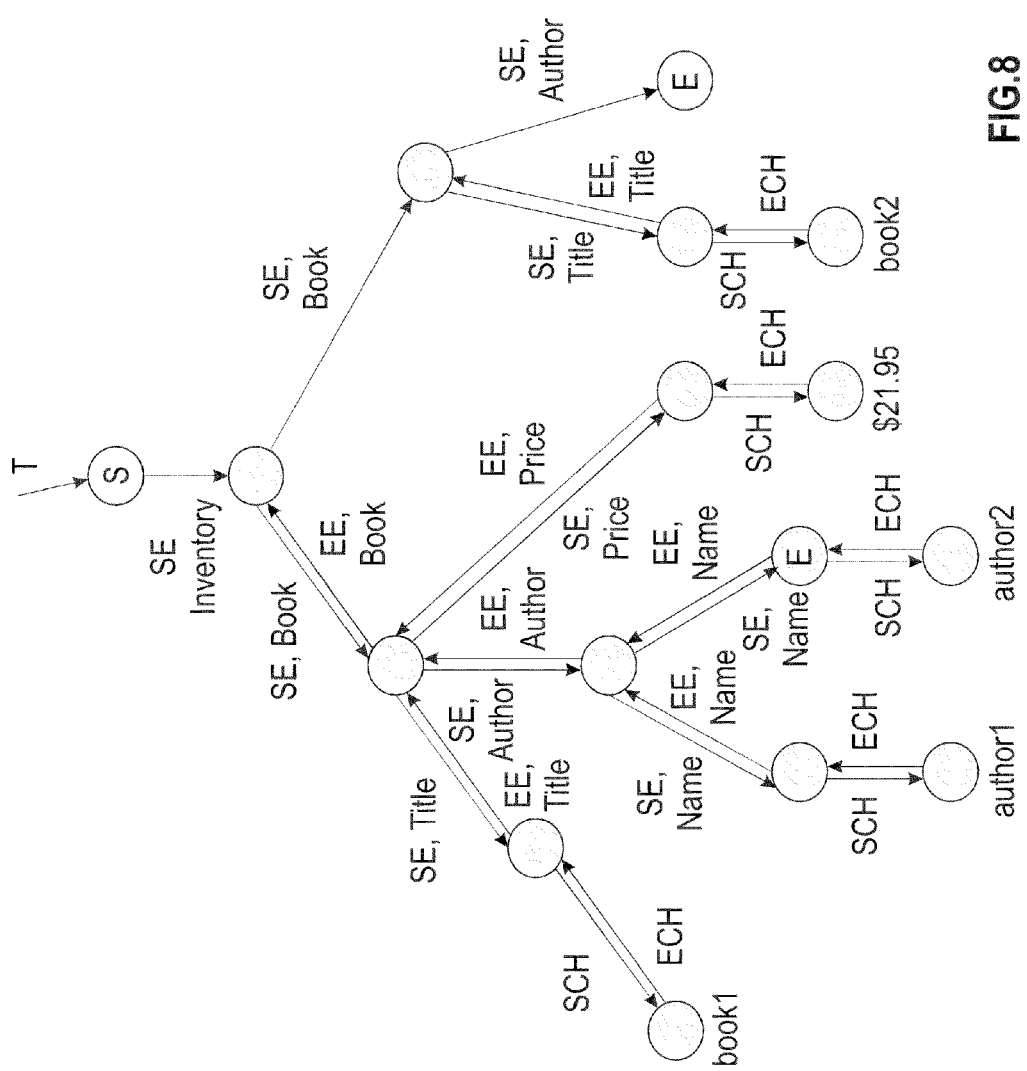
FIG. 8 shows a new DE tree obtained by combining DE trees $T_1$ and $T_2$ illustrated in FIG. 6 according to the first embodiment of the present invention.

Thereafter, the nodes (4 nodes) on the second combining path from the start-parsing node of the second DE tree $T_2$ and the corresponding nodes (4 nodes) on the first combining path from the end-parsing node of the first DE tree $T_1$ are combined respectively to obtain combined new nodes. Thus, the first DE tree $T_1$ and the second DE tree $T_2$ are combined to form a combined new DE tree T which is shown in FIG. 8. In this combining process, because the type fields and name fields of branches on the first combining path match those on the second combining path respectively, the type fields and name fields of combined branches are set to those of corresponding branches on the first combining path (or the second combining path), the start-parsing node of the new DE tree T is set to the start-parsing node of the first DE tree $T_1$, the end-parsing node of the new DE tree T is set to the end-parsing node of the second DE tree $T_2$, and the other internal parsing information is modified accordingly. Up to now, the combination of the first DE tree $T_1$ and the second DE tree $T_2$ has been finished.

Figure 9:
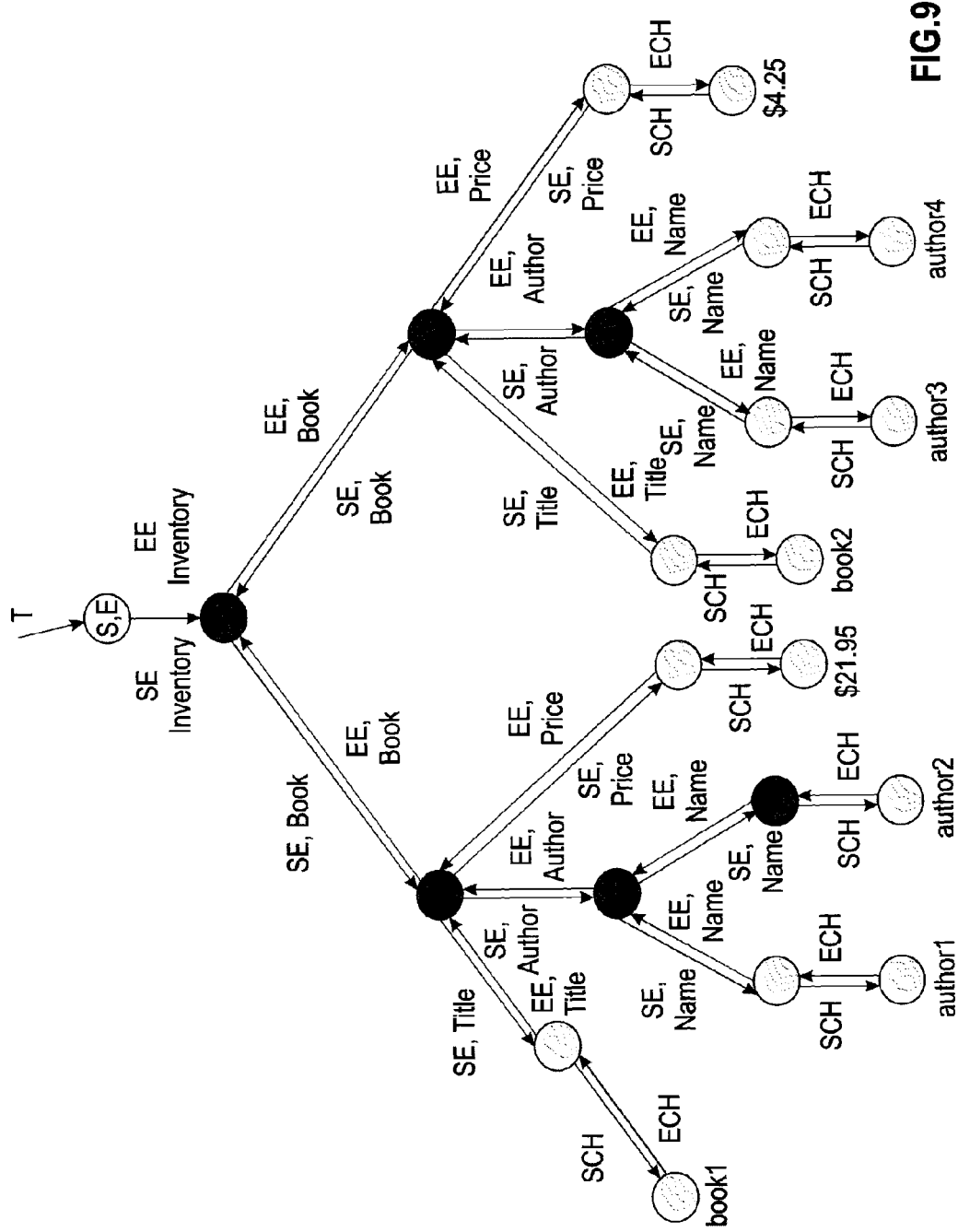
FIG. 9 shows a final parsing result obtained by combining the new DE tree illustrated in FIG. 8 and a DE tree $T_3$ illustrated in FIG. 6 according to the first embodiment of the present invention.

Next, the DE tree T and a next DE tree $T_3$ are combined in the same way and a final combination result is obtained, as shown in FIG. 9. Comparing FIG. 5 and FIG. 9, it can be found that the parsing result obtained by the parallel parsing method according to the first embodiment of the present invention is consistent with that obtained by a traditional XML parsing method.

The parsing method of parsing an XML document in parallel according to the first embodiment of the present invention has been described above, in which XML namespace is not involved. However, since the XML namespace is an important feature of XML specification, a support to the XML namespace is very important. Hereinafter, an XML document parsing method capable of supporting the XML namespace according to a second embodiment of the present invention will be described.

Second Embodiment

The XML namespace, as an important feature in XML specification, is used to address the problem of name conflict in XML documents. When different namespaces are defined in an XML document, an error will occur in a final parsing result if an XML parser can not support the namespaces.

In an XML document, an element should inherit its namespace from all its ancestor elements. For traditional XML parser, since parsing is performed in a serial way, a support to the namespace is not problematic. However, for parallel parsing, since an element may be distributed to a fragment different from the one where its ancestor elements are located when the XML document is split, the element can not inherit its namespace from its ancestor elements when each fragment is parsed individually. This problem is solved by the XML document parallel parsing method according to the second embodiment of the present invention.

To support the namespace, in the XML document parallel parsing method according to the second embodiment of the present invention, a new field NS is added to each node of a DE tree when each fragment is parsed by a PE, and this new field is used to represent all visible namespaces when the node is generated.

The visible namespaces of a node can be composed of two parts, i.e. a base namespace and a local namespace. The base namespace is a namespace inherited by the node from one ancestor node, and the local namespace is a namespace obtained by the parsing from this ancestor node to the current node. Thus, the NS field of a node is defined as having two variables, i.e. a variable pAncestor and a variable localns. The variable pAncestor is a pointer to an ancestor node of the current node, which represents the inheritance relationship between the ancestor node and the current nodes. The variable localns is a namespace aggregation, including all namespaces on the path from the ancestor node to the current node. So, for the current node, the namespace of the ancestor node pointed by pAncestor is the base namespace, and the namespaces in localns are the local namespace.

After the variables pAncestor and localns of the field NS are defined, nodes in each DE tree may be classified into the following three classes: if a node's pAncestor is NULL and localns is empty, the node is called an unknown-namespace node; if a node's pAncestor is NULL and localns isn't empty, which means that the namespace can be obtained directly from localns, the node is called a direct-namespace node; other nodes (i.e. nodes whose pAncestor is not NULL) are called indirect-namespace nodes. Generally, to get all visible namespaces of an indirect-namespace node, several pointer reference operations are needed (when its ancestor node is also an indirect-namespace node), which may cause unpredictable operation cost. In the XML document parser according to the second embodiment of the present invention, only one pointer reference operation is needed to get the namespaces of an indirect-namespace node.

Figure 10:
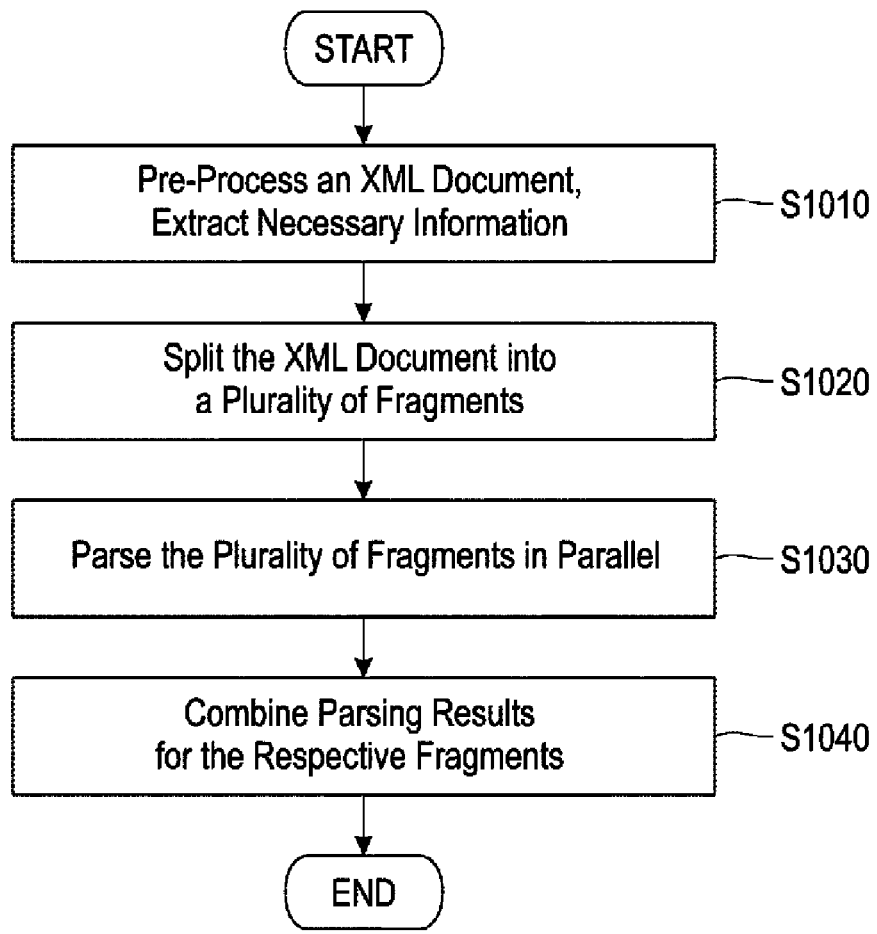
FIG. 10 is a flow chart of an XML document parsing method according to a second embodiment of the present invention.

FIG. 10 shows the method of parsing a XML document in parallel according to the second embodiment of the present invention. In the method of parsing an XML document according to the second embodiment of the present invention, the pre-processing step S1010 and the splitting step S1020 are the same as those of the first embodiment, and thus the description thereof is omitted for the purpose of clarity.

In the parsing step S1030, in addition to the operations described in step S30 of the first embodiment, the following additional operations are preformed. For clarity, the description of the same operations as those of the first embodiment is omitted.

Assume that p is a pointer to a current parsed node, and root is a pointer to the root node of a current fragment. During the parsing, each time p is changed, (1) if the current fragment is a first fragment (a leftmost fragment), the variable pAncestor in the NS field of the current node is set to NULL, and the variable localns is set to be the namespace aggregation obtained by the parsing from root to p, that is, the node p is a direct-namespace node;

(2) if the current fragment is not the first fragment, a) if p==root (i.e. the current node is the root node), the variable pAncestor in the NS field of the current node p is set to NULL, and the variable localns is set to be empty. That is, the current node p is an unknown-namespace node.

b) if p≠root (i.e. the current node is not the root node), the variable pAncestor in the NS field of the current node p is set to point to a node which is on the leftmost path of the fragment and is nearest to the current node p, and the variable localns is set to be the namespaces obtained by the parsing from said nearest node to the current node. That is, the current node p is an indirect-namespace node.

As compared to DE trees in the first embodiment of the present invention, each node in the DE trees obtained by the parsing method according to the second embodiment of the present invention has, in addition to other parameters, an added NS field, and the NS field has a variable pAncestor pointing to a ancestor node and a variable localns representing a local namespace.

Figure 11:
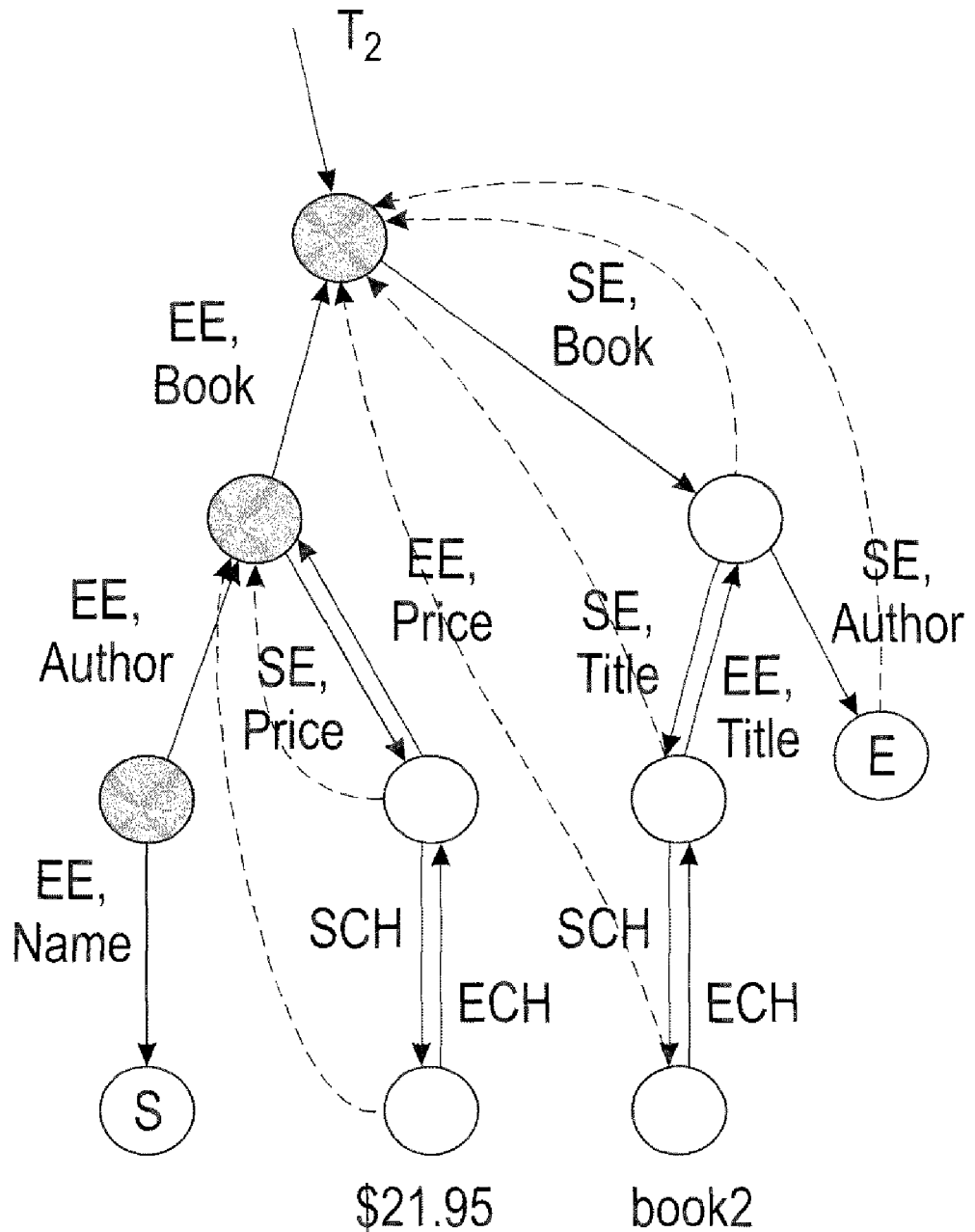
FIG. 11 is a DE tree for a second fragment of the exemplary XML document 1 after the support to namespace is added.

For the above exemplary XML document 1, after the support to the namespace is added as described above, the DE tree for the second fragment $T_2$ (see FIG. 6) is shown in FIG. 11, where nodes on a combining path are shown in gray. This combining path is located at the leftmost side of the DE tree, and the nodes thereon are all unknown-namespace nodes. Other nodes on $T_2$ are all indirect-namespace nodes, and their namespaces can be obtained by referencing namespaces of the nodes on the combining path. The reference relationships between the nodes are shown by dashed lines in FIG. 11.

Returning to FIG. 10, in the combining step S1040, in addition to the operations described for the combining step S40 of the first embodiment, the following additional operations are performed. Likewise, the description of the same operations is omitted for clarity.

When the DE trees obtained in the parsing step S1030 are combined, a first combining path on a first DE tree (on the left) and a second combining path on a second DE tree (on the right) are found out in the same way as that of the first embodiment. The nodes on the first DE tree are denoted as pl and the nodes on the second DE tree are denoted as pr.

Next, when the nodes on the first combining path and the second combining path are combined, the nodes pr on the second combining path will be combined into the nodes pl on the first combining path; the variables pAncestor of the combined nodes are set to NULL, and the variables localns thereof are set to values of the variables localns of corresponding nodes pl.

The following facts may be found. After the parsing step S1030, the nodes on the left combining path in the DE tree are all unknown-namespace nodes, and the variable pAncestor in the NS field of any of the indirect-namespace nodes points to an unknown-namespace node. Further, in any phase of the combination, all nodes of the leftmost DE tree are either direct-namespace nodes or indirect-namespace nodes; for each indirect-namespace node, its variable pAncestor points to one direct-namespace node.

It can be concluded from the above facts that, in each combination of two DE trees, at most one pointer reference operation is needed to convert a combined node to a direct-namespace node; in a final combined DE tree, at most one pointer reference operation is needed to get the namespace of an arbitrary node.

Therefore, the XML document parallel parsing method according to the second embodiment of the present invention can support the XML namespace very well.

Hereinafter, a specific example of parsing a document having namespaces defined using the XML document parsing method according to the second embodiment of the invention is given.

---
[Exemplary XML Document 2]
---
```
<?xml version="1.0">
<k1: INVENTORY xmlns:k1='AA' xmlns:k2='BB'>
    <k1:BOOK>
            <k2:TITLE>BOOK</k2:TITLE>
            <k2:AUTHOR>
                <NAME>Author1</NAME>
                <NAME>Author2</NAME>
           @ </k2:AUTHOR>
            <k2:PRICE>$21.95</k2:PRICE>
     </k1:BOOK>
    <k1:BOOK xmlns:k2='CC'>
            <k2:TITLE>book2</k2:TITLE>
            <k2:AUTHOR>
                <k2:NAME>Author3</k2:NAME>
           @    <k2:NAME>Author4</k2:NAME>
               </k2:AUTHOR>
            <k2:PRICE>$4.25</k2:PRICE>
     </k1:BOOK>
</k1:INVENTORY>
```
---

Figure 12:
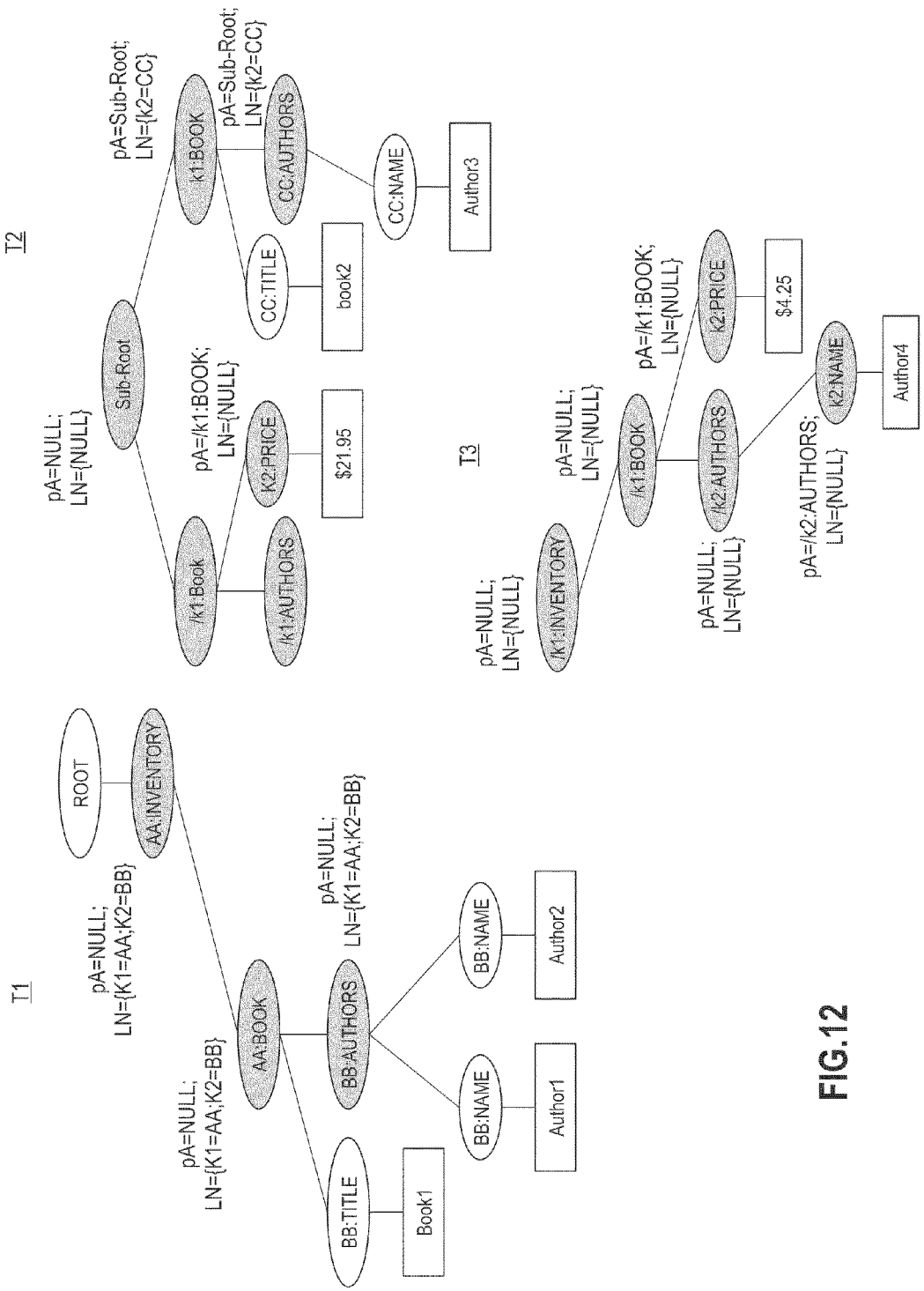
FIG. 12 shows respective DE trees obtained by parsing respective fragments of an exemplary XML document 2 using the XML document parsing method according to the second embodiment of the present invention.
Figure 13:
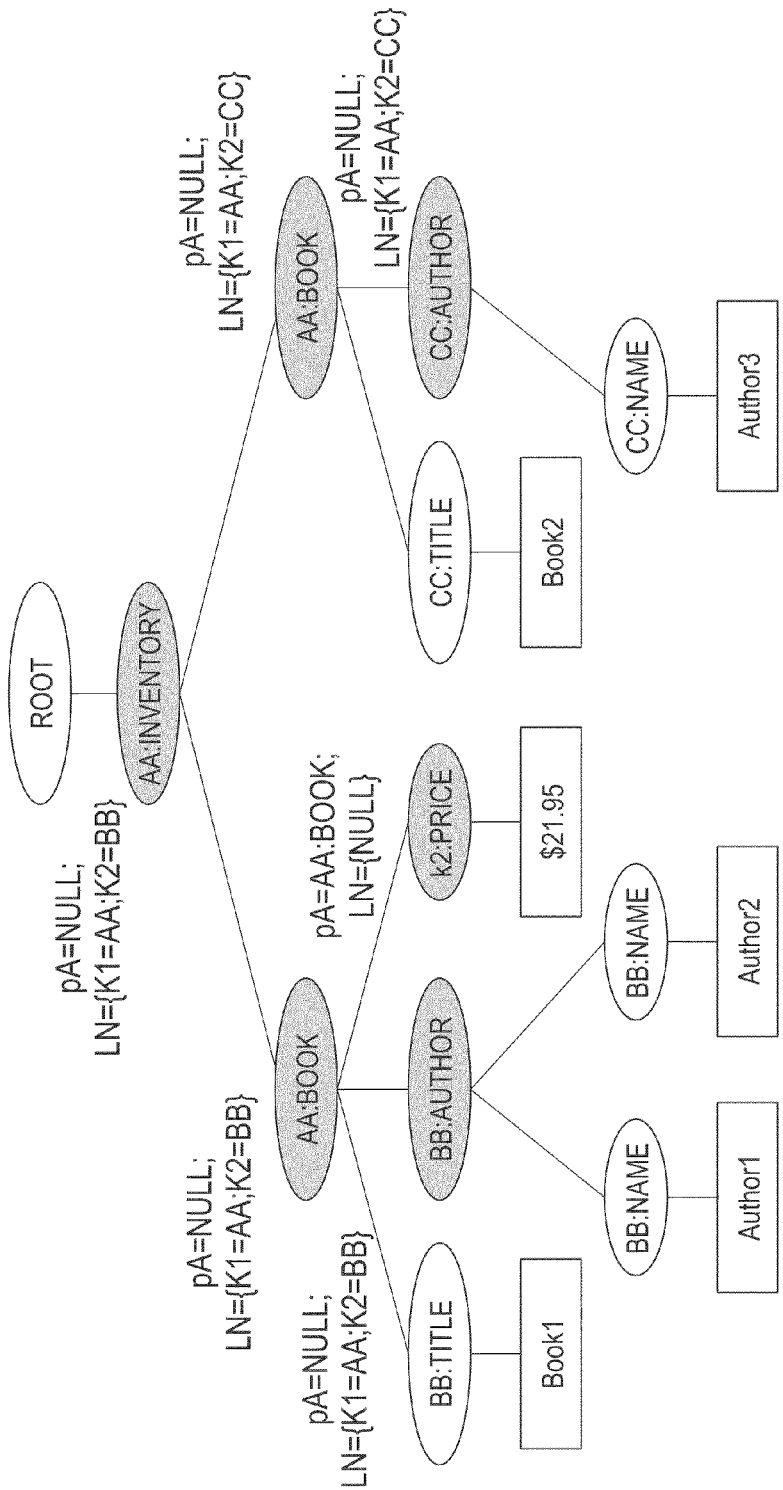
FIG. 13 shows a new DE tree obtained by combining DE trees $T_1$ and $T_2$ illustrated in FIG. 12 according to the second embodiment of the present invention.
Figure 14:
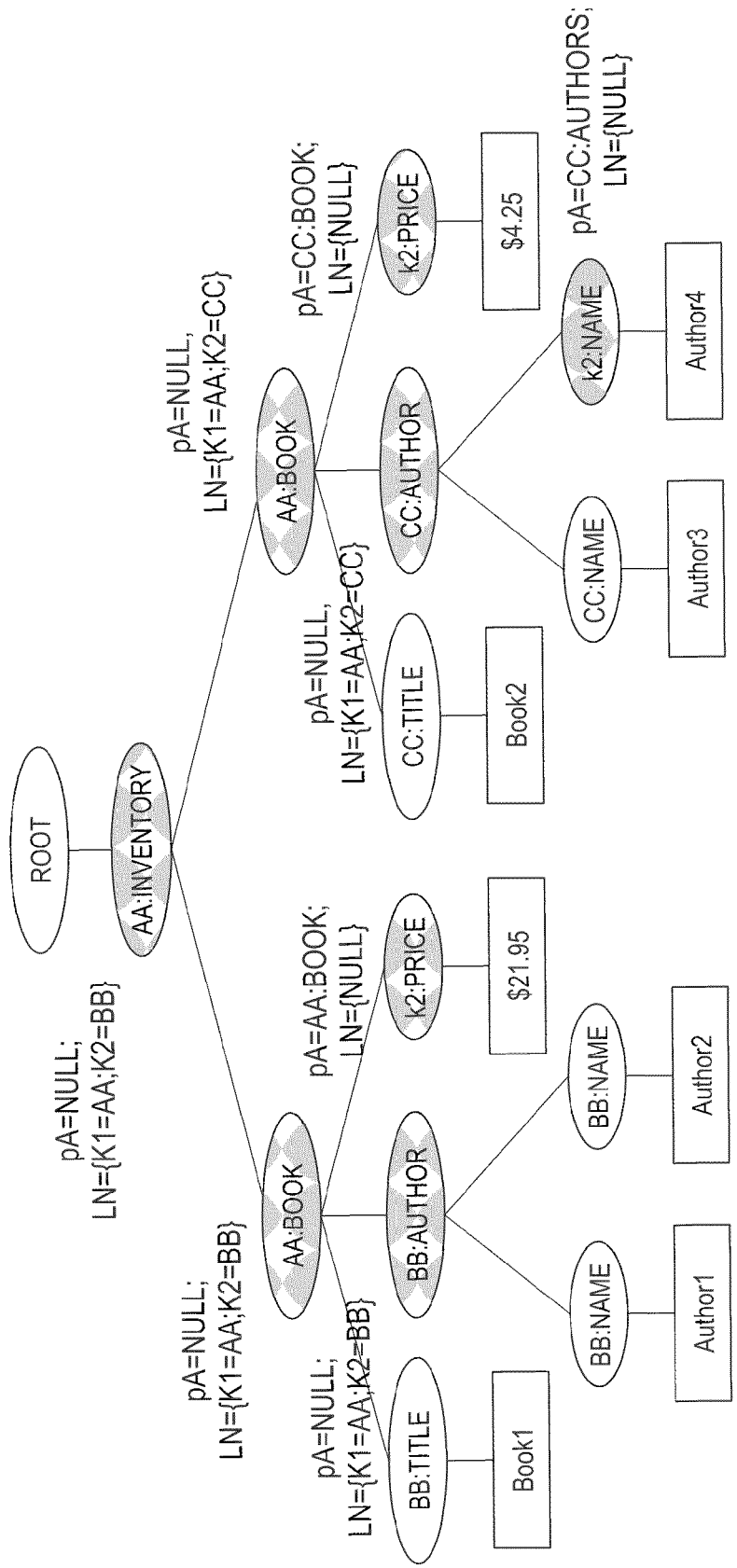
FIG. 14 shows a final parsing result obtained by combining the new DE tree illustrated in FIG. 13 and a DE tree $T_3$ illustrated in FIG. 12 according to the second embodiment of the present invention.

In above exemplary document, the splitting points used to split this XML document into three fragments are shown using a symbol "@". FIG. 12 shows three DE trees obtained by parsing the three fragments in the parsing step S1030. FIG. 13 shows a combination result obtained by combining the first two DE trees in the combining step S1040. FIG. 14 shows a final result obtained by combining the combination result illustrated in FIG. 13 with a third DE tree in the combining step S1040. The final result is consistent with the parsing result obtained by using a traditional XML parser.

It is to be noted that, although the parsing method according to the second embodiment of the invention is described as performing additional steps on the basis of the fragment parsing step S30 and the combining step S40 in the first embodiment to thereby support the XML namespace, those skilled in the art should understand that the basis of the parsing method according to the second embodiment of the invention is not limited to the fragment parsing and combining methods described in the first embodiment, and the support to the XML namespace can also be implemented by performing the additional steps on the basis of any fragment parsing method and corresponding combining method, as long as the fragment parsing method produces trees which are the same as or similar to the double-edge trees described in the invention as parsing results and then the corresponding combining method combines these trees to obtain a final parsing result.

Hereinbefore, the XML document parsing methods according to embodiments of the invention have been described. An XML document parser according to the present invention will be described below with reference to the figures.

Figure 15:
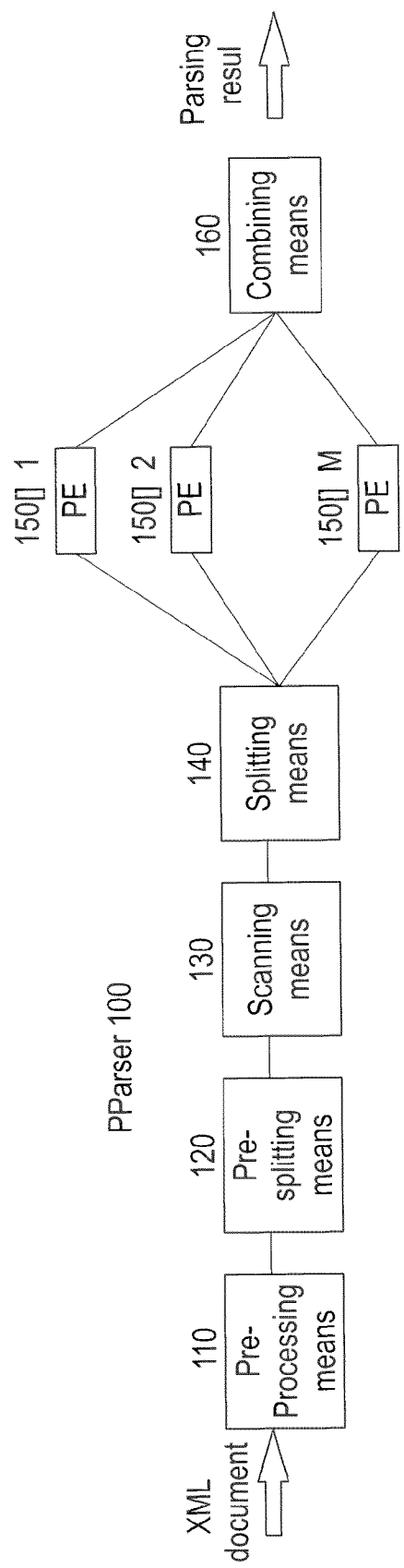
FIG. 15 is a block diagram showing a structure of an XML document parser according to the present invention.

FIG. 15 is a block diagram showing the structure of the XML document parser PParser 100 according to the present invention. As shown in FIG. 15, PParser 100 comprises a pre-processing means 110, a pre-splitting means 120, a scanning means 130, a splitting means 140, multiple processing elements PE 150-1, PE 150-2, . . . , PE 150-N, and a combining means 160.

The pre-processing means 110 is used to extract information necessary for subsequent parsing processes, such as version of an XML document, encoding information, document type definition (DTD) and so on, from a prolog of the XML document before parsing the XML document.

The pre-splitting means 120, the scanning means 130 and the splitting means 140 perform in combination the RCTS method described above so as to split the XML document into a plurality of fragments.

In particular, the pre-splitting means 120 splits a body part of the XML document into the plurality of fragments. Preferably, the pre-splitting means 120 splits the body part of the XML document into N parts according to the number N of available processors. Further, the pre-splitting means 120 preferably equally splits the XML document.

Next, the scanning means 130 scans the N parts. The scanning means 130 forms a virtual scanner for each of the N parts, and each virtual scanner is responsible for scanning one part. Then, the scanning means 130 sequentially performs the scanning tasks of the N virtual scanners in a serial way. For this purpose, the scanning means 130 set the scanning start position of each of the virtual scanners to the beginning of a corresponding part to be scanned; during scanning this part, the virtual scanner scans the character string of this part from left to right from the beginning of this part; and once encountering a left angle bracket "<", the virtual scanner stops scanning this part and record the current stop point. Then, the scanning means 130 starts a next virtual scanner to continue to scan a next part until a last part is scanned. After the scanning is finished, M stop points will be obtained (as described above, M≦N).

Subsequently, the splitting means 140 uses the obtained M stop points as splitting points to split the body part of the XML document into M fragments.

After finishing the splitting, the splitting means 140 assigns the obtained M fragments respectively to M processing elements PE 150-1, PE 150-2, . . . , and PE 150-M which parse these fragments in parallel and produce respective parsing results. The method used by each of the processing elements to parse a corresponding fragment is the same as corresponding operations in the XML document parsing methods according to the first and second embodiments of the present invention, and the description thereof is omitted here for simplicity. Also, it should be appreciated that the method used by the processing elements to parse the respective fragments is not limited to the particular method given here, and actually, there are many fragment parsing methods in the related art which can obtain trees which are the same as or similar to the DE trees described in the invention as parsing results.

Next, the combining means 160 combines the parsing results obtained by the multiple processing elements to form a final parsing result for the entire XML document. The detailed combining method is the same as corresponding operations in the XML document parsing methods according to the first and second embodiments of the present invention, and the description thereof is omitted here for simplicity.

It should be appreciated that the scanning direction of the scanning means 130 is not limited to from left to right, and can also be from right to left. In addition, as a flag of stopping scanning, not only a left angle bracket "<" but also a right angle bracket ">" can be used. Moreover, when encountering the flag, virtual scanners may stop scanning the corresponding part immediately, or continue to scan several characters and then stop scanning this part.

Furthermore, although the means for performing the RCTS method according to the invention are described as three separate means (i.e. the pre-splitting means 120, the scanning means 130 and the splitting means 140), the functions of these means may also be implement by a single processing element in a multi-core processor. That is, the processing element first pre-splits the body part of an XML document into N parts, then sequentially scans the N parts to obtain M stop points like the scanning means 130, and finally uses the obtained M stop points as splitting points to split the XML document into M fragments. Similarly, both the pre-processing means 110 and the combining means 160 may be implemented by a single PE in a multi-core processor.

In addition, although the present invention is described in the context of XML language, those skilled in this art should understand that the XML document parsing method and parser according to the invention are also applicable for parsing some other markup language documents, for example HTML documents and so on.

While the present invention has been particularly shown and described with reference to certain embodiments thereof, it is to be understood by those skilled in this art that various changes and modifications may be made therein in form and details without departing from the spirit and scope of the invention as defined by the following claims and equivalents thereof.

What is claimed is:

1. A method of parsing a markup language document of, the method comprising:
    pre-splitting a body of a markup language document into a plurality of parts;
    scanning each of the plurality parts, wherein while each of the parts is scanned, the scanning of each of the plurality parts is stopped only when a specific mark is found, and then a stop point at which the scanning is stopped is recorded;
    splitting the body of the markup language document into a plurality of fragments using each stop point which has been recorded;
    parsing the plurality of fragments in parallel and producing parsing results for the respective fragments; and
    combining the parsing results for the respective fragments to form a parsing result for the markup language document
    wherein a namespace field is set for each node of a double-edge tree, the namespace field having an ancestor node variable and a local namespace variable, and wherein
    when a first fragment is parsed, the ancestor node variable of a node of the double-edge tree corresponding to the first fragment is set to NULL, and the local namespace variable thereof is set to a namespace aggregation obtained by a parsing from a root node of the double-edge tree to the node; and
    when other fragment is parsed, the ancestor node variable of the node on a leftmost path of the double-edge tree corresponding to the other fragment is set to NULL and the local namespace variable thereof is set to be empty, and the ancestor node variable of each of remaining nodes is set to a node nearest thereto on the leftmost path and the local namespace variable thereof is set to the namespace aggregation obtained by a parsing from the nearest node to the each of remaining nodes, and
    when two double-edge trees corresponding to two adjacent fragments are combined, the ancestor node variable of a combined node is set to NULL, and the local namespace variable thereof is set to a value of the local namespace variable of a corresponding node on the double-edge tree corresponding to a left fragment.

2. The method of parsing a markup language document of claim 1, further comprising:
    collecting version of the markup language document, encoding information and document type definition (DTD) from a prolog of the markup language document before the markup language document is parsed.

3. The method of parsing a markup language document of claim 2, wherein the pre-splitting, the body of the markup language document is equally pre-split into the plurality parts.

4. The method of parsing a markup language document of claim 3, wherein a number of the parts after the pre-splitting is determined according to a number of available processors.

5. The method of parsing a markup language document of claim 4, wherein the specific mark is a left angle bracket "<" or a right angle bracket ">".

6. The method of parsing a markup language document of claim 5, wherein when the specific mark is found, the scanning is stopped immediately, or the scanning is stopped after continuing to scan several characters.

7. The method of parsing a markup language document of claim 1, wherein the double-edge tree includes a start node and an end node, and a flag indicating whether an error occurs when each of the fragments is parsed.

8. The method of parsing a markup language document of claim 7, wherein each of the fragments is re-parsed if the flag indicates that an error occurs.

9. The method of parsing a markup language document of claim 7, wherein the parsing results for the respective fragments are sequentially combined from left to right in a way of:
    (1) finding, in a second double-edge tree corresponding to a right fragment, an upward path from its start node to its root node as a second combining path, and determining a number of nodes on the second combining path;
    (2) finding, in a first double-edge tree corresponding to a left fragment, an upward path having a same number of nodes as the number of nodes upward from its end node as a first combining path;
    (3) combining corresponding nodes on the first and second combining paths to thereby combine the first and second double-edge trees so as to obtain a combined double-edge tree, and modifying a start node and an end node of the combined double-edge tree; and
    (4) repeating elements (1)-(3) for the combined double-edge tree and a double-edge tree corresponding to a next fragment.

10. A parser for parsing a markup language document, comprising:
    a pre-splitting means for pre-splitting a body of the markup language document into a plurality of parts;
    a scanning means for scanning each of the plurality parts, wherein when scanning each of the parts, the scanning means stops the scanning of each of the parts only when a specific mark is found and records a stop point at which the scanning is stopped;
    a splitting means for splitting the body of the markup language document into a plurality of fragments using the respective stop points;

a plurality processing elements each of which is assigned one of the plurality of fragments, the plurality processing elements parsing the plurality of fragments in parallel and producing respective parsing results; and a combining means for combining the parsing results produced by the plurality processing elements to form a parsing result for the markup language document wherein a namespace field is set for each node of a double-edge tree, the namespace field having an ancestor node variable and a local namespace variable, and wherein when a first fragment is parsed, the ancestor node variable of a node of the double-edge tree corresponding to the first fragment is set to NULL, and the local namespace variable thereof is set to a namespace aggregation obtained by a parsing from a root node of the double-edge tree to the node; and when other fragment is parsed, the ancestor node variable of the node on a leftmost path of the double-edge tree corresponding to the other fragment is set to NULL and the local namespace variable thereof is set to be empty, and the ancestor node variable of each of remaining nodes is set to a node nearest thereto on the leftmost path and the local namespace variable thereof is set to the namespace aggregation obtained by a parsing from the nearest node to the each of remaining nodes, and when two double-edge trees corresponding to two adjacent fragments are combined, the ancestor node variable of a combined node is set to NULL, and the local namespace variable thereof is set to a value of the local namespace variable of a corresponding node on the double-edge tree corresponding to a left fragment.

11. The parser as claimed in claim 10, further comprising:

a pre-processing means for collecting version of the markup language document, encoding information and document type definition (DTD) from a prolog of the markup language document before the markup language document is parsed.

12. The parser as claimed in claim 11, wherein the pre-splitting means equally pre-splits the body of the markup language document into the plurality parts.

13. The parser as claimed in claim 12, wherein a number of the parts after the pre-splitting is determined according to a number of available processors.

14. The parser as claimed in claim 13, wherein the specific mark is a left angle bracket "<" or a right angle bracket ">".

15. The parser as claimed in claim 14, wherein when the specific mark is found, the scanning means stops scanning immediately, or stops scanning after continuing to scan several characters.

16. The parser as claimed in claim 15, wherein the double-edge tree includes a start node and an end node, and a flag indicating whether an error occurs when each of the fragments is parsed.

17. The parser as claimed in claim 16, wherein the combining means sequentially combines the parsing results for the respective fragments from left to right in a way of:

(1) finding, in a second double-edge tree corresponding to a right fragment, an upward path from its start node to its root node as a second combining path, and determining a number of nodes on the second combining path;

(2) finding, in a first double-edge tree corresponding to a left fragment, an upward path having a same number of nodes as the number of nodes upward from its end node as a first combining path;

(3) combining corresponding nodes on the first and second combining paths to thereby combine the first and second double-edge trees so as to obtain a combined double-edge tree, and modifying a start node and an end node of the combined double-edge tree; and (4) repeating elements (1)-(3) for the combined double-edge tree and a double-edge tree corresponding to a next fragment.

* * * * *